United States Patent
Jing et al.

(10) Patent No.: US 10,009,374 B1
(45) Date of Patent: Jun. 26, 2018

(54) DETECTING URL SCHEME HIJACKING

(71) Applicant: Symantec Corporation, Mountain View, CA (US)

(72) Inventors: Rui Jing, Los Angeles, CA (US); Jinghao Li, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 247 days.

(21) Appl. No.: 14/817,936

(22) Filed: Aug. 4, 2015

(51) Int. Cl.
| | |
|---|---|
| *H04L 29/06* | (2006.01) |
| *G06F 21/56* | (2013.01) |
| *G06F 21/12* | (2013.01) |
| *G06F 21/60* | (2013.01) |
| *G06F 21/62* | (2013.01) |

(52) U.S. Cl.
CPC ........ *H04L 63/1466* (2013.01); *G06F 21/128* (2013.01); *G06F 21/56* (2013.01); *G06F 21/606* (2013.01); *G06F 21/62* (2013.01); *H04L 63/145* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 2004/0064721 | A1* | 4/2004 | Murching | H04L 63/101 726/1 |
| 2014/0095874 | A1* | 4/2014 | Desai | H04L 63/0815 713/168 |
| 2014/0177839 | A1* | 6/2014 | Wagner | H04L 9/0822 380/259 |
| 2016/0036971 | A1* | 2/2016 | Velthuis | H04M 3/42382 455/466 |
| 2016/0050193 | A1* | 2/2016 | Kanov | H04W 12/06 726/7 |
| 2016/0381041 | A1* | 12/2016 | Bean | H04L 63/145 726/23 |

OTHER PUBLICATIONS https://www.youtube.com/watch?v=p86Kv1uHO-s.

* cited by examiner

*Primary Examiner* — Eleni A Shiferaw
*Assistant Examiner* — Andrew J Steinle
(74) *Attorney, Agent, or Firm* — Holland & Hart LLP (57) ABSTRACT

A computer-implemented method for detecting malware is described. In some embodiments, the method includes identifying an application identifier of a first application paired with a universal resource locator (URL) scheme, and storing the identified pairing of the application identifier and URL scheme of the first application in a database. In some cases, the database stores URL scheme pairings of a plurality of applications. In some embodiments, the method includes identifying an application identifier of a first application paired with a universal resource locator (URL) scheme, identifying a second application as an unknown application, detecting a request to register a URL scheme pairing of the second application, querying the database based on the request to register the URL scheme pairing of the second application, and determining whether the second application is potential malware based on a result of the querying.

13 Claims, 7 Drawing Sheets

| Application Identifier 305 | URL Scheme 310 |
|---|---|
| com.wellsfargo.bankingapp | bankingapp:// |
| com.activision.gameapp | gameapp:// |
| com.fidelity.financeapp | financeapp:// |
| com.amazon.shoppingapp | shoppingapp:// |

DETECTING URL SCHEME HIJACKING

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

The wide-spread use of computers and mobile devices has caused an increased presence of malicious programs such as rootkits, spyware, trojans, and the like. Malware programmers are continually adapting to the improvements made in malware detection, which creates an ongoing cycle of malware techniques adapting to improvements in malware detection. Accordingly, benefits may be realized by improving the techniques in identifying a source of a malware attack.

SUMMARY

According to at least one embodiment, a computer-implemented method for detecting malware is described. In one embodiment, the method may include identifying, via a processor, an application identifier of a first application paired with a universal resource locator (URL) scheme, wherein the URL scheme of the first application enables an external process to execute the first application. In some embodiments, the method may include storing, via the processor, the identified pairing of the application identifier and URL scheme of the first application in a database, wherein the database stores URL scheme pairings of a plurality of applications. In one embodiment, the method may include identifying a second application as an unknown application. In some embodiments, the method may include detecting a request to register a URL scheme pairing of the second application. In one embodiment, the method may include querying the database based on the request to register the URL scheme pairing of the second application. In some embodiments, the method may include determining whether the second application is potential malware based on a result of the querying.

In some embodiments, the method may include determining whether the URL scheme pairing for the second application includes the URL scheme of the first application. In one embodiment, upon determining the URL scheme pairing for the second application includes the URL scheme of the first application, the method may include marking the second application as potential malware. In some embodiments, upon marking the second application as potential malware, the method may include performing a malware scan on the second application. In one embodiment, the method may include determining whether the URL scheme pairing for the second application includes the application identifier of the first application.

In some embodiments, upon determining the URL scheme pairing for the second application does not include the application identifier of the first application, the method may include marking the second application as potential malware. In one embodiment, upon determining the URL scheme pairing for the second application includes the application identifier of the first application, the method may include marking the second application as a potentially safe application. In some embodiments, the method may include querying a sequence of a call stack associated with a calling of the first application via the URL scheme of the first application. In one embodiment, the method may include identifying a third application calling the first application as a result of querying the sequence of the call stack.

In one embodiment, the method may include identifying an application identifier of the third application. In some embodiments, the method may include checking the database for a match on the identified application identifier of the third application. In one embodiment, upon determining, based on the checking the database, the identified application identifier does not include the application identifier of the first application and that the identified application identifier of the third application is associated with the URL scheme of the first application, the method may include marking the third application as potential malware. In some embodiments, the application identifier may include at least one of a bundle identifier and a URL identifier.

A computing device configured for detecting malware is also described. The device may include a processor and memory in electronic communication with the processor. The memory may store instructions that are executable by the processor for the steps of identifying, via a processor, an application identifier of a first application paired with a universal resource locator (URL) scheme, wherein the URL scheme of the first application enables an external process to execute the first application, storing, via the processor, the identified pairing of the application identifier and URL scheme of the first application in a database, wherein the database stores URL scheme pairings of a plurality of applications, identifying a second application as an unknown application, detecting a request to register a URL scheme pairing of the sec- and application, querying the database based on the request to register the URL scheme pairing of the second application, and determining whether the second application is potential malware based on a result of the querying.

A computer-program product for detecting malware is also described. The computer-program product may include a non-transitory computer-readable medium that stores instructions. The instructions may be executable by a processor for the steps of identifying, via a processor, an application identifier of a first application paired with a universal resource locator (URL) scheme, wherein the URL scheme of the first application enables an external process to execute the first application, storing, via the processor, the identified pairing of the application identifier and URL scheme of the first application in a database, wherein the database stores URL scheme pairings of a plurality of applications, identifying a second application as an unknown application, detecting a request to register a URL scheme pairing of the second application, querying the database based on the request to register the URL scheme pairing of the second application, and determining whether the second application is potential malware based on a result of the querying.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to detecting malware. More specifically, the systems and methods described herein relate to detecting malware in relation to malware hijacking a universal resource locator (URL) scheme of a mobile application.

A URL scheme enables a native mobile application to be launched from another mobile application, browser, or web application. Options may be set in the URL that is passed to the launched application. For example, a URL scheme may be used to transfer data from a free version to a paid version of a mobile application. In some cases, the URL scheme may allow a first mobile application or web page to call a second mobile application and/or allow the first mobile application or web page to send data to the second mobile application. Additionally, or alternatively, the custom URL scheme may handle callbacks for custom authentication (e.g., such as OAuth) and third party API's.

A URL scheme enables a mobile application to communicate with other mobile applications through a protocol that a user defines. To communicate with a mobile application that implements such a scheme, the user must create an appropriately formatted URL and ask the system to open it. To implement support for a custom scheme, the mobile application declares to the mobile operating system that it supports the specified URL scheme. Thus, in some embodiments, a mobile application may register a URL scheme with the mobile operating system. In some cases, a configuration file of the mobile application (e.g., Info.plist) may specify a URL scheme associated with the mobile application. The configuration file may specify an association between an identifier of the mobile application (e.g., URL identifier, application bundle identifier, etc.) and a URL scheme. In some cases, the mobile applications bundler identifier may be identical to the URL identifier. Alternatively, in some cases, the bundle identifier may be different than the URL identifier. Based on this registration, the mobile operating system may allow the mobile application to handle incoming URLs that use the registered URL scheme. As one example, a URL scheme may enable a mobile application to send an email message from the mobile application. A URL scheme may be used to open an email mobile application and populate a new email with information. For example, the email mobile application may be opened by using the URL scheme mailto:email@example.com.

A developer may specify a URL scheme such as "schemename://" in relation to a URL identifier of a mobile application (e.g., bankapp://payid=89394848). The developer may configure the mobile application to support one or more specified URL schemes. As one example, a first mobile application may be configured to accept the URL scheme "schemename://" so that when "schemename://" is entered in a mobile web browser, the browser, in conjunction with the mobile operating system, is instructed to open the first mobile application. Additionally, or alternatively, a second mobile application may open the first mobile application by calling the "schemename://" URL scheme associated with the first mobile application. The second mobile application may send data to the first mobile application by appending additional information to the "schemename://" URL scheme. In the case where two applications use the same URL scheme, the mobile operating system may not know which application to open. Thus, URL schemes are recommended to be unique and difficult to guess. In some cases, a malicious entity may attempt to hijack a URL scheme. The malicious entity may execute malicious code and/or install a malicious application on the mobile device that uses the same URL scheme as a legitimate application. When the URL scheme of the legitimate application is called, the malicious code may be executed and/or the malicious application may be opened instead of the legitimate application. The malicious application may present a fake user interface that mimics the user interface of the legitimate application. Thus, a user may enter credentials in the fake user interface, allowing the malicious application to capture the user's credentials. To counter the malicious entity from hijacking a registered URL scheme, the present systems and methods may generate a database of mappings between URL schemes and legitimate mobile applications. When a URL scheme is called, the systems and methods may check the URL identifier and/or bundle ID of the application called by the URL scheme against the database mappings. If the URL identifier and/or bundle ID of the application that called the URL scheme does not match a mapping in the database or the application using the URL scheme is not running as the first, originating application, then the application may be marked as suspicious or potential malware. The systems and methods may scan code and/or applications marked as suspicious to verify whether they are malicious.

Figure 1:
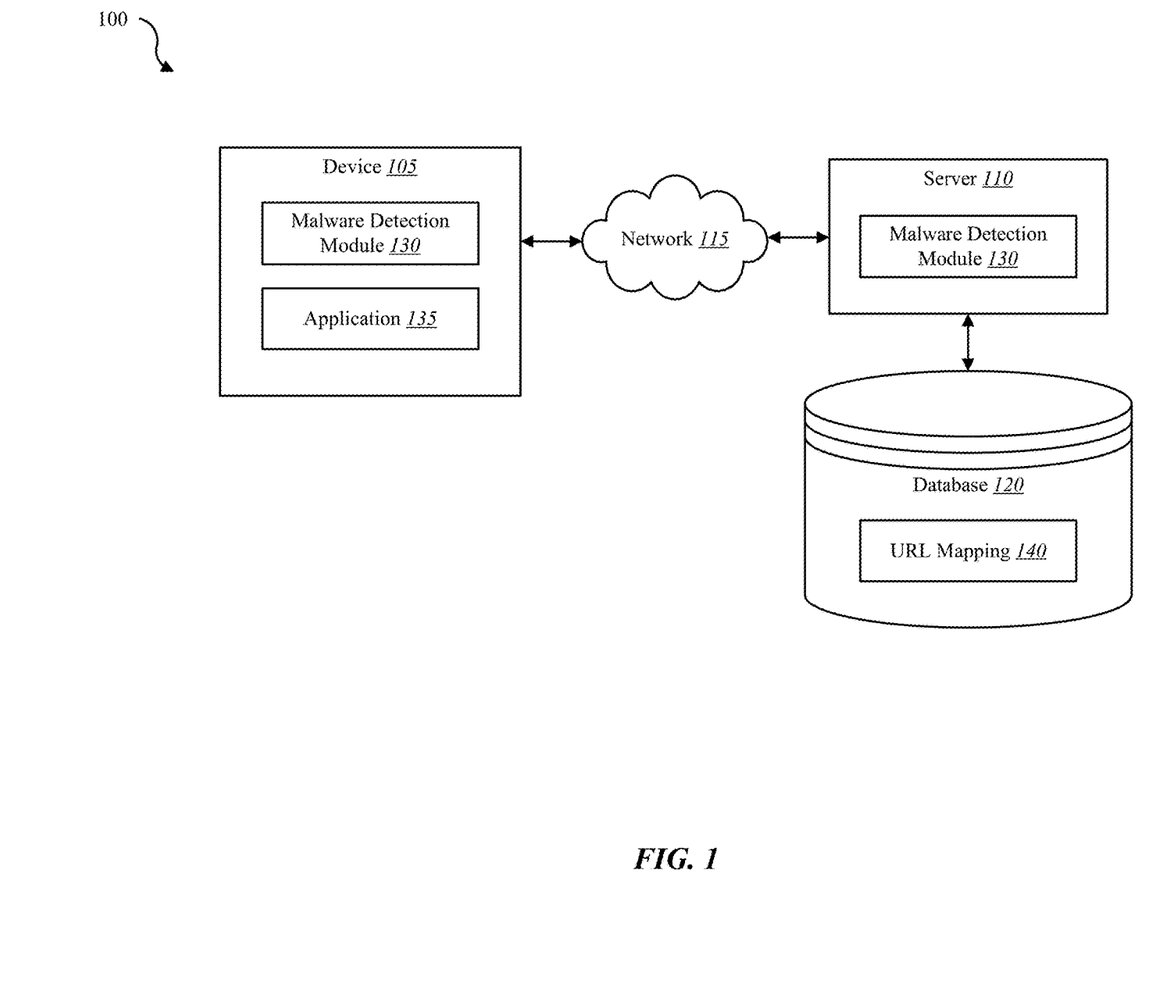
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, database 120, and a network 115 that allows the device 105, database 120, and the server 110 to communicate with one another.

Examples of the device 105 may include any combination of mobile devices, smart phones, personal computing devices, computers, laptops, desktops, servers, media content set top boxes, etc. In some configurations, the device 105 may include malware detection module 130 and/or application 135. Although the components of the device 105 are depicted as being internal to the device 105, it is understood that one or more of the components may be external to device 105 and connect to device 105 through wired and/or wireless connections.

Examples of application 135 may include any combination of a program installed on a server, a program installed on a personal computer, a mobile application installed on a mobile computing device, a web browser, a web-based application (e.g., any combination of JavaScript, hypertext markup language (HTML), and cascading style sheets (CSS)), etc. In some embodiments, application 135 may be installed on device 105 to enable a user of device 105 to interface with a function of server 110, database 120, and/or malware detection module 130. For example, application 135 may allow device 105 to interface with the malware detection module 130 on another device such as on server 110. In some cases, server 110 may include an application similar to application 135, that enables server 110 to interface with the malware detection module 130 on device 105.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. In some embodiments, device 105 and/or server 110 may include a malware detection module 130 where at least a portion of the functions of malware detection module 130 are performed separately and/or concurrently on device 105 and/or server 110. In some cases, network 115 may include malware detection module 130 where at least a portion of the functions of malware detection module 130 are performed separately and/or concurrently on a network device of network 115, device 105, and/or server 110.

In some embodiments, server 110 may be coupled to database 120. Database 120 may be internal or external to the server 110. In one example, device 105 may be coupled directly to database 120, database 120 being internal or external to device 105. Additionally, or alternatively, device 105 may include a first database (internal or external) and server may include a second database (database 120 being an example of the first and/or second databases). In some cases, network 115 may include a database such as database 120. Database 120 may include a URL mapping 140. The URL mapping 140 may include one or more pairings between an application identifier and a URL scheme.

In some embodiments, malware detection module 130 may store one or more such pairings in database 120. In one embodiment, malware detection module 130 may include one or more processors, memory, non-volatile storage, firmware, and/or software. Malware detection module 130 may detect malware on a mobile computing device hijacking a URL scheme associated with a mobile application. Further details regarding the malware detection module 130 are discussed below.

Figure 2:
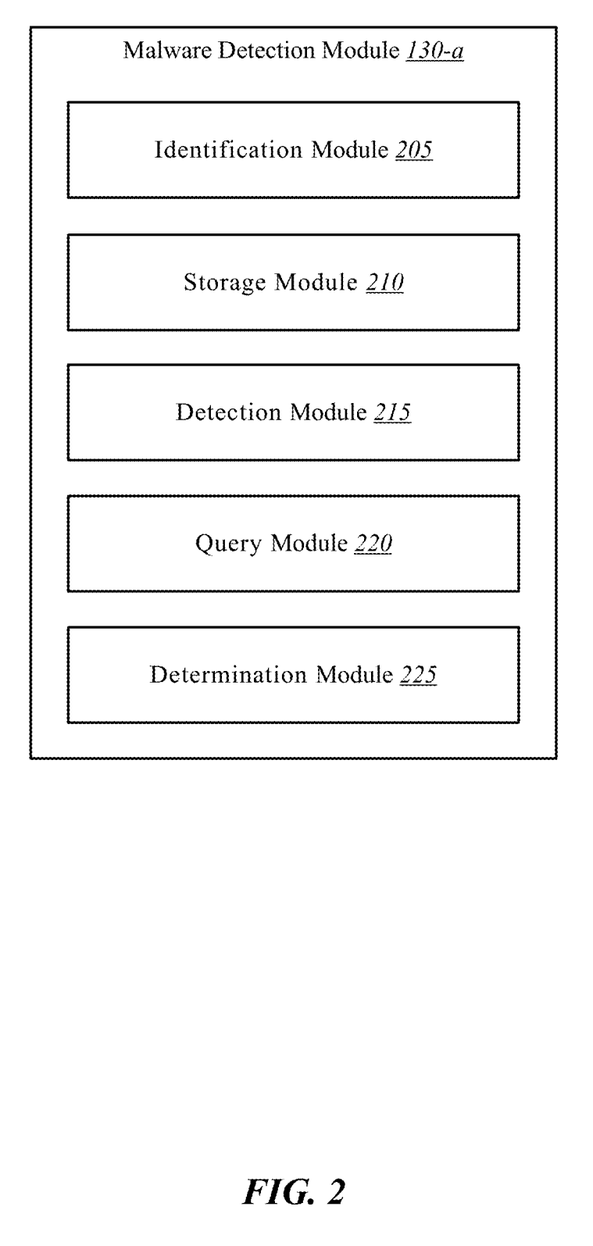
FIG. 2 is a block diagram illustrating one example of a malware detection module.

FIG. 2 is a block diagram illustrating one example of a malware detection module 130-a. Malware detection module 130-a may be one example of malware detection module 130 depicted in FIG. 1. As depicted, malware detection module 130-a may include identification module 205, storage module 210, detection module 215, query module 220, and/or determination module 225. In one embodiment, at least one aspect of malware detection module 130-a may include software and/or hardware elements of a network data storage system. For example, the malware detection module 130-a may be part of a cloud storage application configured to store data in a secured data environment.

The components of the malware detection module 130-a may, individually or collectively, be implemented using one or more application specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In some embodiments, identification module 205 may identify an application identifier of a first application paired with a universal resource locator (URL) scheme, wherein the URL scheme of the first application enables an external process to execute the first application. In one embodiment, the first application may be an example of application 135 depicted in FIG. 1. As one example, the first application may be a financial application. Thus, a URL scheme may be assigned to the financial application. The URL scheme (e.g., bankapp://payid=89394848) of the financial application may allow another application to open the financial application by referencing the URL scheme.

In one embodiment, identification module 205 may identify a second application as an unknown application. In some embodiments, the second application may be another application, in addition to application 135, loaded on a device (e.g., device 105 of FIG. 1). In some cases, the second application may be a malicious application that attempts to mimic a user interface of the first application to steal credentials of a user. For example, the device may include a financial transaction application and a shopping application. The financial transaction application may register a URL scheme with an operating system of the device. The shopping application may legitimately call the first application by calling the URL scheme of the financial application. For instance, the shopping application may call the URL scheme of the financial application to process a payment. Thus, an AMAZON® application installed on the device may call the URL scheme of a PAYPAL® application installed on the device to open the PAYPAL® application and process a payment. A malicious application may be installed on the device. The malicious application may be designed to mimic a user interface of the financial transaction application to steal a user's credentials. The malicious application may attempt to register a URL scheme matching that of the financial transaction application. Thus, when the shopping application makes a call to open the financial transaction application via the registered URL scheme, the device's operating system may open the malicious application instead of the legitimate financial transaction application. The faked user interface of the malicious application may be presented to the user and request the user's user name and password. If the user enters these credentials, then the malicious application may capture the credentials and use them to gain access to the user's account on the legitimate financial transaction application.

In one embodiment, identification module 205 may determine information regarding a mobile application by querying a configuration file associated with the mobile application. For example, an Info.plist file may be queried to gather information regarding a mobile application on an iOS system. Thus, information regarding an application identifier, URL scheme, etc., may be gathered by querying the configuration file.

In some embodiments, storage module 210 may store the identified pairing of the application identifier and URL scheme of the first application in a database. The database may store URL scheme pairings of a plurality of applications. As one example, the first application may be a financial application. Storage module 210 may store the application identifier and URL scheme of the financial application in a database. Examples of possible financial applications may include PAYPAL®, ALIPAY®, FIDELITY INVESTMENTS®, etc.

In some embodiments, detection module 215 may detect a request to register a URL scheme pairing of the second application. As one example, detection module 215 may detect a request to register the URL scheme of a financial transaction application. An example of the URL scheme of the financial transaction application may be "paymentapp://payid=37218283" for example. In some embodiments, query module 220 may query the database based on the request to register the URL scheme pairing of the second application. As one example, upon detecting, via detection module 215, an unknown application making a request to register a URL scheme pairing that includes the URL scheme "bankingapp://" query module 220 may query the database relative to this URL scheme. Determination module 225 may determine, based on a result of the query, whether a URL scheme pairing with this URL scheme already exists. For example, the URL scheme pairing of a banking application may have already registered the URL scheme "bankingapp://" in its URL pairing.

In some embodiments, determination module 225 may determine whether a second application is potential malware based on the result received from query module 220. In one embodiment, determination module 225 may determine whether the URL scheme pairing for the second application includes the URL scheme of the first application. In some embodiments, determination module 225 may upon determining the URL scheme pairing for the second application includes the URL scheme of the first application, mark the second application as potential malware. In one embodiment, determination module 225 may upon marking the second application as potential malware, perform a malware scan on the second application. In some embodiments, determination module 225 may determine whether the URL scheme pairing for the second application includes the application identifier of the first application. In one embodiment, upon determining the URL scheme pairing for the second application does not include the application identifier of the first application, determination module 225 may mark the second application as potential malware. In some embodiments, upon determining the URL scheme pairing for the second application includes the application identifier of the first application, determination module 225 may mark the second application as a potentially safe application.

In some cases, determination module 225 may determine an application identifier of the unknown application. Determination module 225 may determine whether this application identifier of the unknown application matches, at least in part, the application identifier of the already registered URL scheme pairing. For example, a legitimate application for "Bank USA" may register a URL scheme pairing that includes an application identifier "com.bankusa.bankingapp" and "bankingapp://" as its URL scheme. Thus, when another application calls the URL scheme "bankingapp://" the Bank USA application is opened. Another application, Bank USA 2.0, may be installed on the device. This new application may include an application identifier "com.bankusa2.bankingapp." When the determination module 225 compares the two application identifiers, the determination module 225 may determine that the two identifiers are largely identical. The determination module 225 may merely mark the unknown application as potentially suspicious and continue to monitor its activity. In some cases, the determination module 225 may prompt the user with a warning and to confirm whether the application ought to be trusted. In the case where the application identifier of the unknown application does not match that of a legitimate application that has registered a URL scheme pairing using the same URL scheme, then the unknown application may be marked as potential malware and further investigated such as performing a malware scan on the unknown application.

In one embodiment, upon determining the URL scheme pairing for the second mobile application does include the URL scheme of the first mobile application, determination module 225 may generate a notification indicating a potential URL scheme collision. In some cases, the notification may be sent to a developer associated with the one or more of the affected mobile applications. Additionally, or alternatively, the notification may be sent to a company associated with an operating system of a mobile computing device executing the mobile applications.

In some embodiments, identification module 205 may identify a third application calling the first application as a result of querying the sequence of the call stack. In one embodiment, identification module 205 may identify an application identifier of the third application. As one example, the third application may be a malicious application that mimics a user interface of a legitimate application and attempts to hijack the URL scheme of the legitimate application and present the faked user interface to the user to steal the credentials of the user. Thus, the malicious application may hijack the URL scheme of the financial application and mimic the interface of a legitimate application in an attempt to steal user credentials. In one embodiment, query module 220 may check the database for a hit on the identified application identifier of the third application. For example, upon detecting a request to register the URL scheme of a suspicious malicious application, query module 220 may query a database for a match on the application identifier of the third application. Upon determining, based on querying the database, the identified application identifier of the third application does not include the application identifier of the first application and that the identified application identifier of the third application is associated with the URL scheme of the first application, identification module 205 may mark the third application as potential malware.

Figure 3:
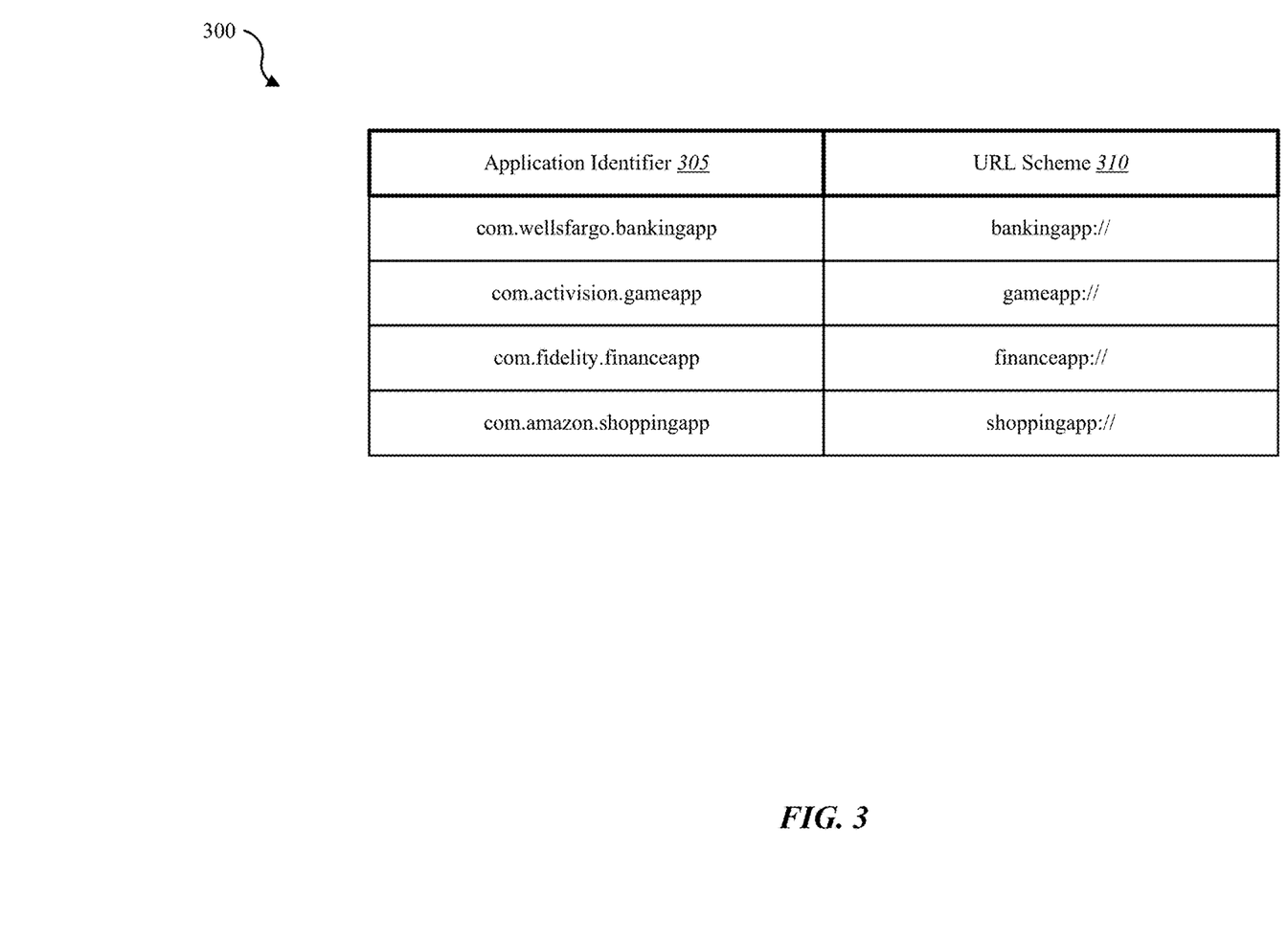
FIG. 3 is a block diagram illustrating one example of an environment in which the present systems and methods may be implemented.

FIG. 3 is a block diagram illustrating one example of an environment 300 in which the present systems and methods may be implemented. In some configurations, operations associated with the environment 300 may be implemented in conjunction with malware detection module 130 of FIGS. 1 and/or 2. In some configurations, the operations associated with the application 300 may be implemented in conjunction with an application (e.g., application 135) and/or a user interface of device 105 and/or server 110 in FIG. 1. In some embodiments, application 300 may be one example of application 135 of FIG. 1. As illustrated, the environment 300 depicts a URL mapping of one or more pairings between an application identifier and a URL scheme. As depicted, environment 300 may include an application identifier 305 and a URL scheme 310.

In one embodiment, application identifier 305 may include one or more application identifiers. Examples of an application identifier 305 may include com.wellsfargo.bankingapp, com.activision.gameapp, com.fidelity.financeapp, com.amazon.shoppingapp, and/or the like.

In one embodiment, URL scheme 310 may include one or more URL schemes. Examples of a URL scheme 310 may include bankingapp://, gameapp://, financeapp://, shoppingapp://, and/or the like.

In some embodiments, application identifier 305 and URL scheme 310 may be paired together. For example, application identifier com.wellsfargo.bankingapp may be paired with URL scheme bankingapp://, application identifier com.activision.gameapp may be paired with URL scheme gameapp://, application identifier com.fidelity.financeapp may be paired with URL scheme financeapp://, and/or application identifier com.amazon.shoppingapp may be paired with URL scheme shoppingapp://, etc.

Examples of applications with an application identifier and a URL scheme may include financial applications (PAYPAL®, ALIPAY® etc.) and shopping applications (AMAZON.com®, TARGET.com®, etc.). By storing and using both an application identifier and a URL scheme, users may securely make purchases without running the risk of being intercepted by a malicious application.

Figure 4:
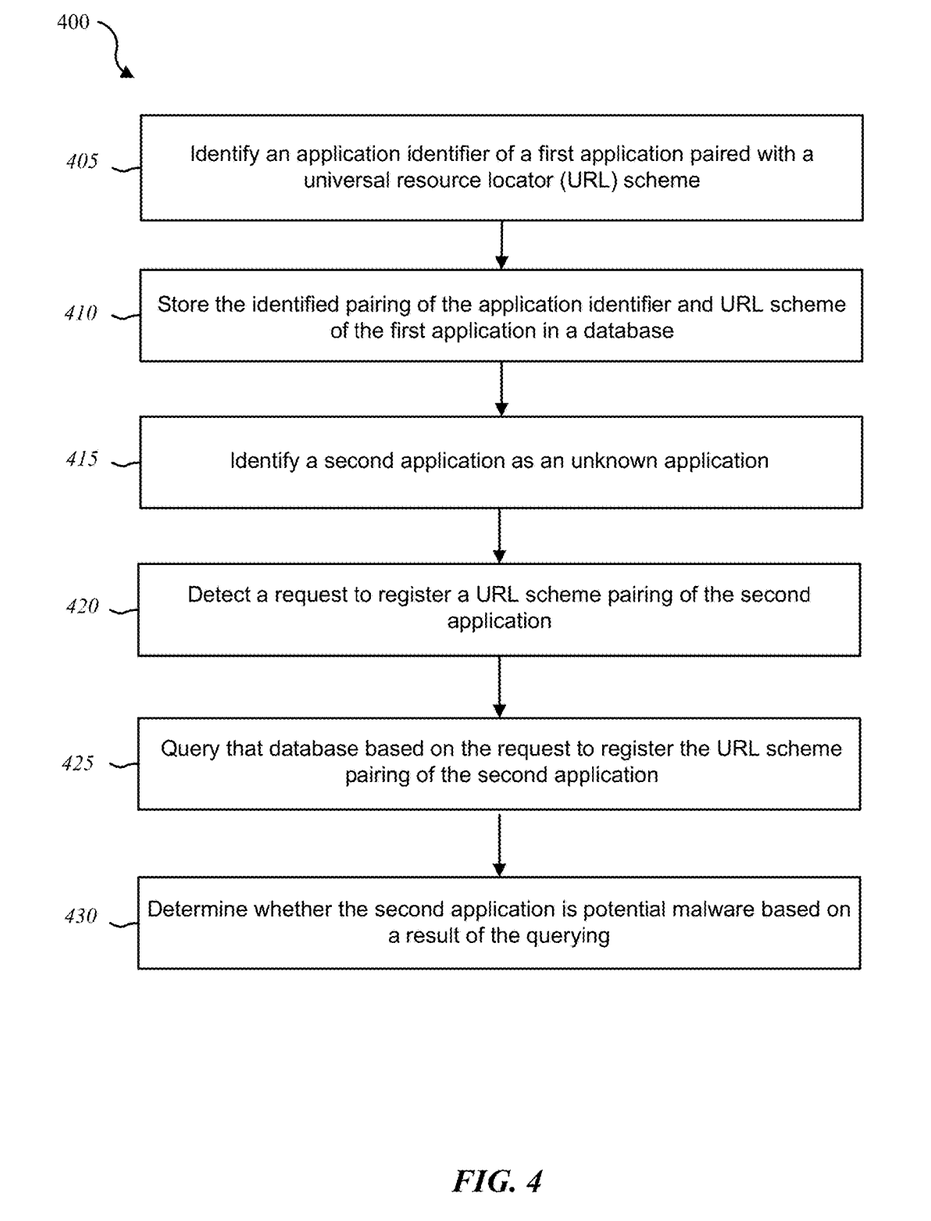
FIG. 4 is a flow diagram illustrating one embodiment of a method for detecting malware.

FIG. 4 is a flow diagram illustrating one embodiment of a method 400 for detecting malware. In some configurations, the method 400 may be implemented by the malware detection module 130 illustrated in FIGS. 1 and/or 2. In some configurations, the method 400 may be implemented in conjunction with application 135 and/or a user interface of device 105 in FIG. 1.

At block 405, the method 400 may include identifying an application identifier of a first application paired with a universal resource locator (URL) scheme, wherein the URL scheme of the first application enable an external process to execute the first application. At block 410, the method 400 may include storing the identified pairing of the application identifier and URL scheme of the first application in a database, wherein the database stores URL scheme pairings of a plurality of applications. At block 415, the method 400 may include identifying a second application as an unknown application.

At block 420, the method 400 may include detecting a request to register a URL scheme pairing of the second application. At block 425, the method 400 may include querying the database based on the request to register the URL scheme pairing of the second application. At block 430, the method 400 may include determining whether the second application is potential malware based on a result of the querying.

In some embodiments, any and/or all of the methods shown in blocks 405-430 may be performed by, or at, one or more of: a device, a user unit, an apparatus, an access point, a network, a database, and/or other components, elements, and/or modules.

Thus, the method 400 may relate to detecting malware in a distributed data system. It should be noted that the method 400 is just one implementation and that the operations of the method 400 may be rearranged or otherwise modified such that other implantations are possible.

Figure 5:
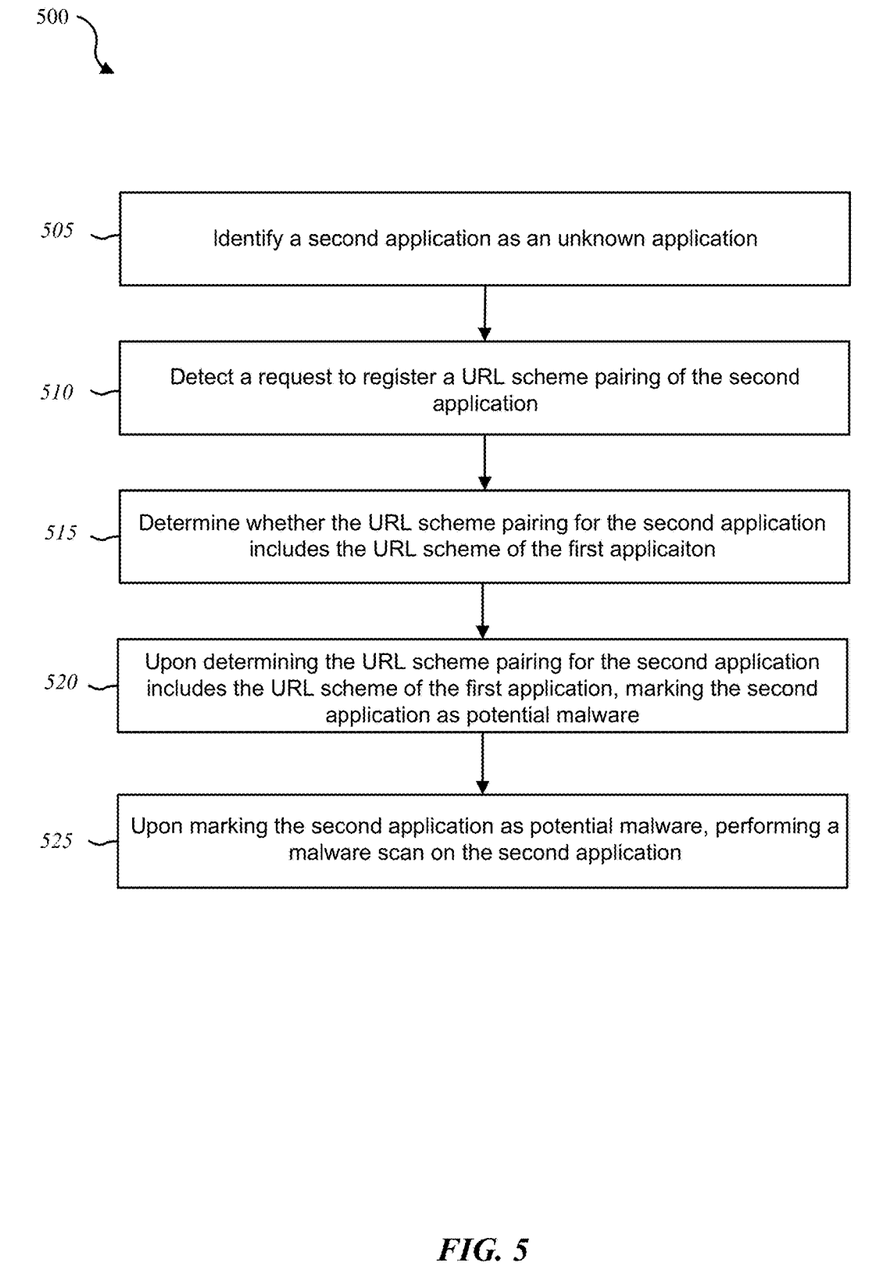
FIG. 5 is a flow diagram illustrating another embodiment of a method for detecting malware.

FIG. 5 is a flow diagram illustrating another embodiment of a method 500 for detecting malware. In some configurations, the method 500 may be implemented by the malware detection module 130 illustrated in FIGS. 1 and/or 2. In some configurations, the method 500 may be implemented in conjunction with application 135 and/or a user interface of device 105 in FIG. 1.

At block 505, the method 500 may include identifying a second application as an unknown application. At block 510, the method 500 may include detecting a request to register a URL scheme pairing of the second application. At block 515, the method 500 may include determining whether the URL scheme pairing for the second application includes the URL scheme of the first application.

At block 520, upon determining the URL scheme pairing for the second application includes the URL scheme of the first application, the method 500 may include marking the second application as potential malware. At block 525, upon marking the second application as potential malware, the method 500 may include performing a malware scan on the second application.

In some embodiments, any and/or all of the methods shown in blocks 505-425 may be performed by, or at, one or more of: a device, a user unit, an apparatus, an access point, a network, a database, and/or other components, elements, and/or modules.

Thus, the method 500 may relate to detecting malware in a distributed data system. It should be noted that the method 500 is just one implementation and that the operations of the method 500 may be rearranged or otherwise modified such that other implantations are possible.

Figure 6:
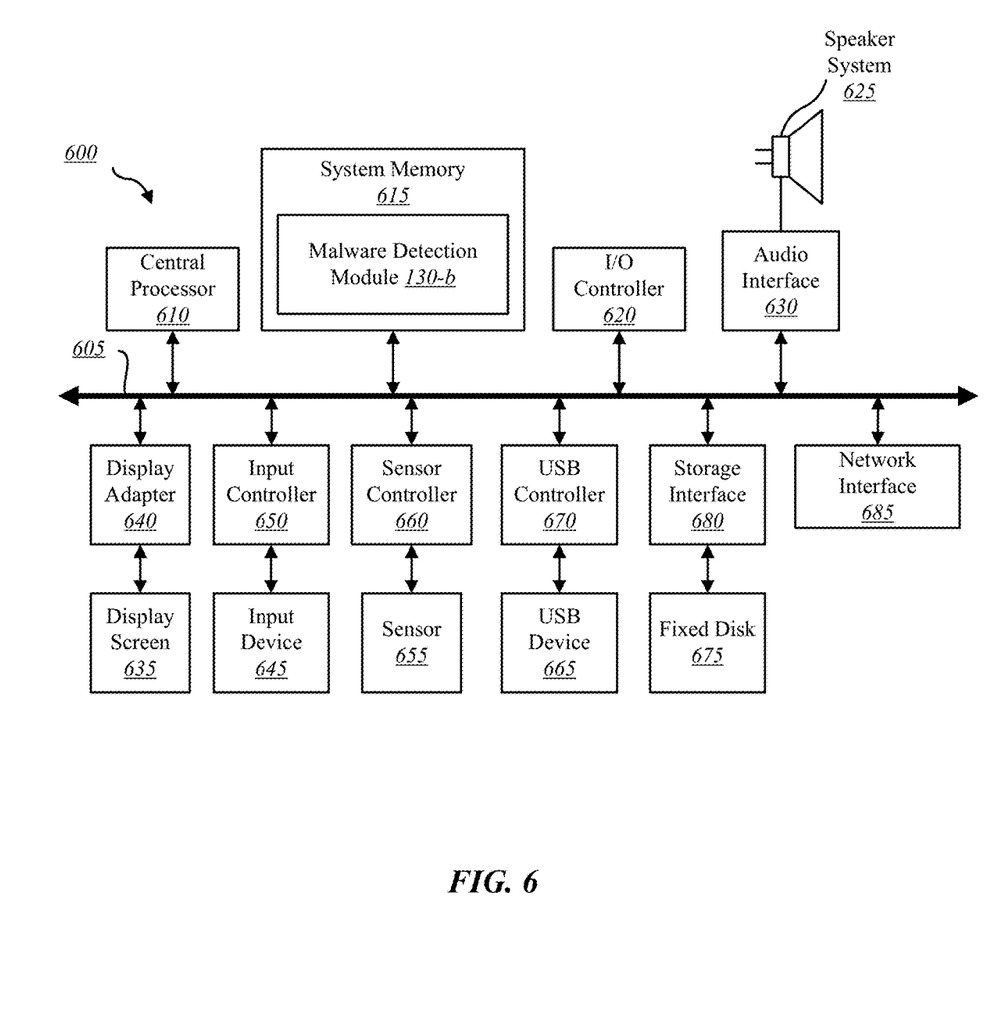
FIG. 6 depicts a block diagram of a computer system suitable for implementing the present systems and methods.

FIG. 6 shows a system 600 for detecting malware, in accordance with various examples. System 600 may illustrate an apparatus, which may be an example of any one of device 105, server 110, and/or database 120 of FIG. 1. System 600 may include components for bi-directional voice and data communications including components for transmitting communications and components for receiving communications. For example, system 600 may communicate bi-directionally with one or more storage devices and/or client systems. This bi-directional communication may be direct (e.g., system 600 communicating directly with a storage system) and/or indirect (e.g., system 600 communicating indirectly with a client device through a server).

System 600 may include a processor module 605, and memory 610 (including software/firmware code (SW) 615), an input/output controller module 620, a user interface module 625, a network adapter 630, and a storage adapter 635. The software/firmware code 615 may be one example of a software application executing on system 600. The network adapter 630 may communicate bi-directionally, via one or more wired links and/or wireless links, with one or more networks and/or client devices. In some embodiments, network adapter 630 may provide a direct connection to a client device via a direct network link to the Internet via a POP (point of presence). In some embodiments, network adapter 630 of system 600 may provide a connection using wireless techniques, including digital cellular telephone connection, Cellular Digital Packet Data (CDPD) connection, digital satellite data connection, and/or another connection. The system 600 may include a malware detection module 130-b, which may perform the functions described above for the malware detection module 130 of FIGS. 1, and/or 2.

The signals associated with system 600 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 630 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

One or more buses 640 may allow data communication between one or more elements of system 600 (e.g., processor module 605, memory 610, I/O controller module 620, user interface module 625, network adapter 630, and storage adapter 635, etc.).

The memory 610 may include random access memory (RAM), read only memory (ROM), flash RAM, and/or other types. The memory 610 may store computer-readable, computer-executable software/firmware code 615 including instructions that, when executed, cause the processor module 605 to perform various functions described in this disclosure. Alternatively, the software/firmware code 615 may not be directly executable by the processor module 605 but may cause a computer (e.g., when compiled and executed) to perform functions described herein. Alternatively, the computer-readable, computer-executable software/firmware code 615 may not be directly executable by the processor module 605, but may be configured to cause a computer (e.g., when compiled and executed) to perform functions described herein. The processor module 605 may include an intelligent hardware device, e.g., a central processing unit (CPU), a microcontroller, an application-specific integrated circuit (ASIC), etc.

In some embodiments, the memory 610 may contain, among other things, the Basic Input-Output system (BIOS) which may control basic hardware and/or software operation such as the interaction with peripheral components or devices. For example, the malware detection module 130-b to implement the present systems and methods may be stored within the system memory 610. Applications resident with system 600 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 630, etc.).

Many other devices and/or subsystems may be connected to one or may be included as one or more elements of system 600 (e.g., personal computing device, mobile computing device, smart phone, server, internet-connected device, cell radio module, and so on). In some embodiments, all of the elements shown in FIG. 6 need not be present to practice the present systems and methods. The devices and subsystems can be interconnected in different ways from that shown in FIG. 6. In some embodiments, an aspect of some operation of a system, such as that shown in FIG. 6, may be readily known in the art and are not discussed in detail in this application. Code to implement the present disclosure can be stored in a non-transitory computer-readable medium such as one or more of system memory 610 or other memory. The operating system provided on I/O controller module 620 may be iOS®, ANDROID®, MS-DOS®, MS-WINDOWS®, OS/2®, UNIX®, LINUX®, or another known operating system.

The I/O controller 620 may operate in conjunction with network adapter 630 and/or storage adapter 635. The network adapter 630 may enable system 600 with the ability to communicate with client devices (e.g., device 105 of FIG. 1), and/or other devices over the network 115 of FIG. 1. Network adapter 630 may provide wired and/or wireless network connections. In some cases, network adapter 630 may include an Ethernet adapter or Fibre Channel adapter. Storage adapter 635 may enable system 600 to access one or more data storage devices (e.g., storage device 140). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 7:
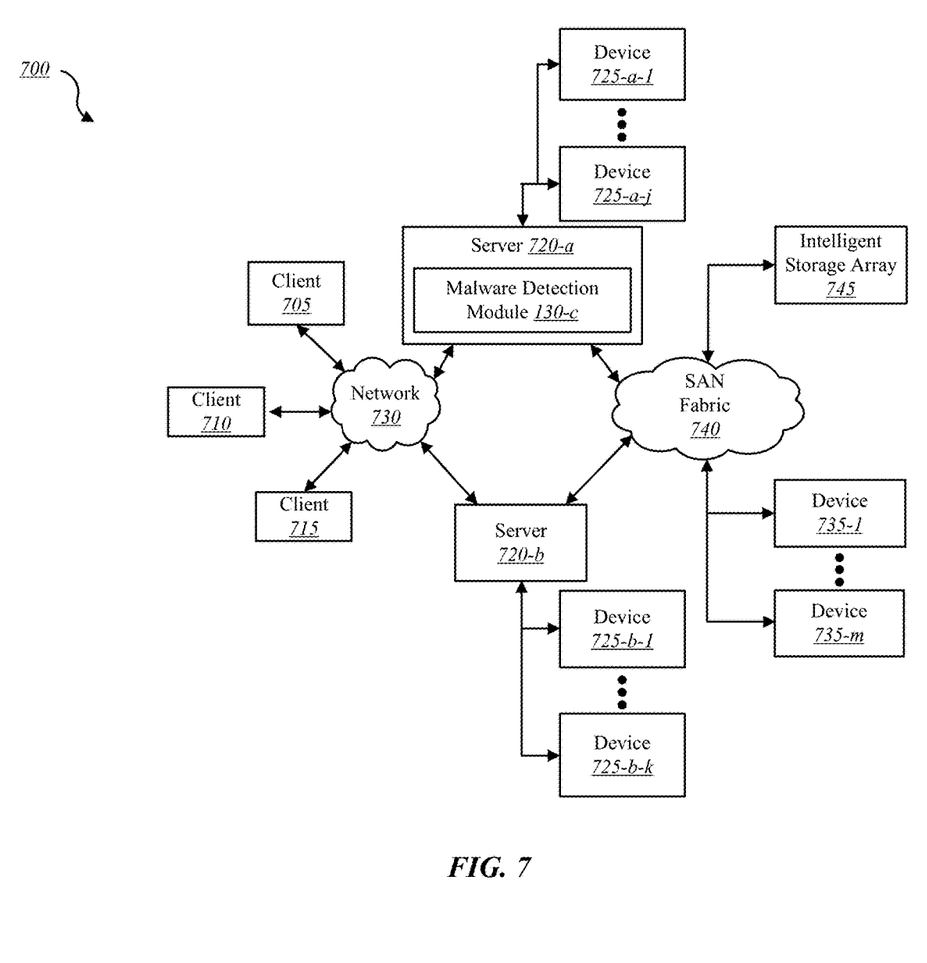
FIG. 7 is a block diagram depicting a network architecture in which client systems, as well as storage servers (any of which can be implemented using the computer system).

FIG. 7 is a block diagram depicting a network architecture 700 in which client systems 705, 710 and 715, as well as storage servers 720-a and 720-b (any of which can be implemented using computer system 600), are coupled to a network 730. In one embodiment, malware detection module 130-c may be located within one of the storage servers 720-a, 720-b to implement the present systems and methods. Malware detection module 130-c may be one example of malware detection module 130 depicted in FIGS. 1, 2, and/or 6. The storage server 720-a is further depicted as having storage devices 725-a-l through 725-a-j directly attached, and storage server 720-b is depicted with storage devices 725-b-l through 725-b-k directly attached. SAN fabric 740 supports access to storage devices 735-l through 735-m by storage servers 720-a and 720-b, and so by client systems 705, 710 and 715 via network 730. Intelligent storage array 745 is also shown as an example of a specific storage device accessible via SAN fabric 740.

With reference to computer system 600, network interface 685 or some other method can be used to provide connectivity from each of client computer systems 705, 710 and 715 to network 730. Client systems 705, 710 and 715 are able to access information on storage server 720-a or 720-b using, for example, a web browser or other client software (not shown). Such a client allows client systems 705, 710 and 715 to access data hosted by storage server 720-a or 720-b or one of storage devices 725-a-l-725-a-j, 725-b-l-725-b-k, 735-l-735-m or intelligent storage array 745. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the present systems and methods and their practical applications, to enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for detecting malware, comprising:
    identifying, via a processor, an application identifier of a first application paired with a universal resource locator (URL) scheme, wherein the URL scheme of the first application enables an external process to execute the first application;
    storing, via the processor, the identified pairing of the application identifier and URL scheme of the first application in a database, wherein the database stores URL scheme pairings of a plurality of applications;
    identifying a second application as an unknown application;
    detecting a request to register a URL scheme pairing of the second application;
    querying the database based on the request to register the URL scheme pairing of the second application to determine whether the URL scheme pairing for the second application includes the URL scheme of the first application;
    determining whether the second application is potential malware based on a result of the querying;
    marking the second application as potential malware based at least in part on the determining; and
    performing a malware scan on the second application.

2. The method of claim 1, comprising:
    determining whether the URL scheme pairing for the second application includes the application identifier of the first application.

3. The method of claim 2, comprising:
    upon determining the URL scheme pairing for the second application does not include the application identifier of the first application, marking the second application as potential malware.

4. The method of claim 2, comprising:
    upon determining the URL scheme pairing for the second application includes the application identifier of the first application, marking the second application as a potentially safe application.

5. The method of claim 1, comprising:
    querying a sequence of a call stack associated with a calling of the first application via the URL scheme of the first application; and
    identifying a third application calling the first application as a result of querying the sequence of the call stack.

6. The method of claim 1, comprising:
    identifying an application identifier of the third application; and
    checking the database for a match on the identified application identifier of the third application.

7. The method of claim 6, comprising:
    upon determining, based on the checking the database, the identified application identifier does not include the application identifier of the first application and that the identified application identifier of the third application is associated with the URL scheme of the first application, marking the third application as potential malware.

8. The method of claim 1, wherein the application identifier includes at least one of a bundle identifier and a URL identifier.

9. A computing device configured for detecting malware, comprising:
    a processor;
    memory in electronic communication with the processor, wherein the memory stores computer executable instructions that when executed by the processor cause the processor to perform the steps of:
    identifying, via a processor, an application identifier of a first application paired with a universal resource locator (URL) scheme, wherein the URL scheme of the first application enables an external process to execute the first application;
    storing, via the processor, the identified pairing of the application identifier and URL scheme of the first application in a database, wherein the database stores URL scheme pairings of a plurality of applications;
    identifying a second application as an unknown application;
    detecting a request to register a URL scheme pairing of the second application;
    querying the database based on the request to register the URL scheme pairing of the second application to determine whether the URL scheme pairing for the second application includes the URL scheme of the first application;
    determining whether the second application is potential malware based on a result of querying the database;

marking the second application as potential malware based at least in part on the determining; and performing a malware scan on the second application.

10. The computing device of claim 9, wherein the instructions executed by the processor cause the processor to perform the steps of:

determining whether the URL scheme pairing for the second application includes the application identifier of the first application.

11. The computing device of claim 9, wherein the instructions executed by the processor cause the processor to perform the steps of:

upon determining the URL scheme pairing for the second application does not include the application identifier of the first application, marking the second application as potential malware.

12. The computing device of claim 11, wherein the instructions executed by the processor cause the processor to perform the steps of:

upon determining the URL scheme pairing for the second application includes the application identifier of the first application, marking the second application as a potentially safe application.

13. A non-transitory computer-readable storage medium storing computer executable instructions that when executed by a processor cause the processor to perform the steps of:

identifying, via a processor, an application identifier of a first application paired with a universal resource locator (URL) scheme, wherein the URL scheme of the first application enables an external process to execute the first application;

storing, via the processor, the identified pairing of the application identifier and URL scheme of the first application in a database, wherein the database stores URL scheme pairings of a plurality of applications;

identifying a second application as an unknown application;

detecting a request to register a URL scheme pairing of the second application;

querying the database based on the request to register the URL scheme pairing of the second application to determine whether the URL scheme pairing for the second application includes the URL scheme of the first application;

determining whether the second application is potential malware based on a result of the querying;

marking the second application as potential malware based at least in part on the determining; and performing a malware scan on the second application.

* * * * *